(12) United States Patent
Wykman et al.

(10) Patent No.: US 11,162,435 B2
(45) Date of Patent: Nov. 2, 2021

(54) CARBURETOR ASSEMBLY START SETTING DETECTION ARRANGEMENT

(71) Applicant: Husqvarna AB, Huskvarna (SE)

(72) Inventors: Tomas Wykman, Jönköping (SE); Henrik Eklund, Tenhult (SE); Mikael Larsson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 25 days.

(21) Appl. No.: 16/616,026

(22) PCT Filed: May 30, 2018

(86) PCT No.: PCT/SE2018/050545
§ 371 (c)(1),
(2) Date: Nov. 22, 2019

(87) PCT Pub. No.: WO2018/231120
PCT Pub. Date: Dec. 20, 2018

(65) Prior Publication Data
US 2020/0141334 A1 May 7, 2020

(30) Foreign Application Priority Data
Jun. 12, 2017 (SE) .................................. 1750744-3

(51) Int. Cl.
*F02M 1/02* (2006.01)
*F02D 41/06* (2006.01)
(Continued)

(52) U.S. Cl.
CPC ............. *F02D 11/106* (2013.01); *F02M 1/02* (2013.01); *F02B 2075/025* (2013.01);
(Continued)

(58) Field of Classification Search
CPC .. F02D 11/106; F02D 41/067; F02D 41/0002; F02D 41/062; F02D 2009/0205;
(Continued)

(56) References Cited

U.S. PATENT DOCUMENTS

| 4,391,249 | A | * | 7/1983 | Bianchi | .................... | F02M 7/12 |
| | | | | | | 123/438 |
| 2004/0130039 | A1 | * | 7/2004 | Suzuki | .................. | F02M 23/03 |
| | | | | | | 261/23.2 |

(Continued)

FOREIGN PATENT DOCUMENTS

| DE | 4243779 A1 | 6/1994 |
| DE | 10330899 A1 | 2/2005 |

(Continued)

OTHER PUBLICATIONS

Swedish Search Report for Application No. 1750744-3 dated Dec. 21, 2017.

(Continued)

*Primary Examiner* — George C Jin
(74) *Attorney, Agent, or Firm* — Burr & Forman, LLP (57) ABSTRACT

The present disclosure relates to a carburetor assembly (7) comprising a control unit (17), an air channel (8), a throttle valve (9), a choke valve (10), a pulsed fuel valve (11), and a fuel supply line (12). The control unit (17) is adapted to control the fuel valve (11) to supply fuel in accordance with a certain start setting, where the choke valve (10) can be open or closed. The carburetor assembly (7) comprises a rotation angle detector assembly (20) with a choke detector part (29) that is mounted to a choke shaft (30) that is connected to the choke valve (10) such that the choke detector part (29) is arranged to rotate together with the choke valve (10). The rotation angle detector assembly (20) further comprises a choke sensor device (23, 33) that is connected to the control unit (17) and can be affected by the (Continued)

choke detector part (29) such that the choke sensor device (23, 33) provides different output signals to the control unit (17) in dependence of whether the choke valve (10) is open or closed.

12 Claims, 6 Drawing Sheets

(51) Int. Cl.
*F02D 11/10* (2006.01)
*F02B 75/02* (2006.01)
*F02D 9/02* (2006.01)
*F02M 7/12* (2006.01)
*F02M 17/04* (2006.01)

(52) U.S. Cl.
CPC .... *F02D 41/067* (2013.01); *F02D 2009/0205* (2013.01); *F02D 2009/0279* (2013.01); *F02D 2200/0404* (2013.01); *F02M 7/12* (2013.01); *F02M 17/04* (2013.01)

(58) Field of Classification Search
CPC ..... F02D 2009/0279; F02D 2200/0404; F02D 35/0053; F02M 1/02; F02M 1/08; F02M 7/12; F02M 17/04; F02B 2075/025
See application file for complete search history.

(56) References Cited

U.S. PATENT DOCUMENTS

| | | |
|---|---|---|
| 2005/0022790 A1 | 2/2005 | Nickel et al. |
| 2005/0263130 A1* | 12/2005 | Ludwig .................. F02B 27/02 123/306 |
| 2008/0258582 A1* | 10/2008 | Buerger ................ G01D 5/145 310/68 B |
| 2009/0013965 A1* | 1/2009 | Bahner .................. F02M 17/04 123/438 |
| 2012/0193112 A1 | 8/2012 | Gwosdz et al. |
| 2013/0068974 A1 | 3/2013 | Galka et al. |
| 2013/0133618 A1* | 5/2013 | Larsson .................. F02M 1/08 123/438 |
| 2014/0005001 A1 | 1/2014 | Karrar |
| 2014/0028332 A1 | 1/2014 | Praeger et al. |
| 2014/0183315 A1* | 7/2014 | Lindstrom ............. G01D 5/145 248/314 |
| 2015/0047609 A1* | 2/2015 | Kleczewski ............... F02D 1/02 123/438 |
| 2017/0002775 A1* | 1/2017 | Takada ................ F02M 35/0201 |
| 2019/0024611 A1* | 1/2019 | Wykman .................. F02B 75/02 |

FOREIGN PATENT DOCUMENTS

| | | |
|---|---|---|
| EP | 1288630 B1 | 6/2008 |
| WO | 2009116902 A1 | 9/2009 |
| WO | 2012002888 A1 | 1/2012 |
| WO | 2013022390 A1 | 2/2013 |

OTHER PUBLICATIONS

International Search Report and Written Opinion for International Application No. PCT/SE2018/050545 dated Jul. 3, 2018.

\* cited by examiner

CARBURETOR ASSEMBLY START SETTING DETECTION ARRANGEMENT

TECHNICAL FIELD

The present disclosure relates to a carburetor assembly comprising a control unit, an air channel, a throttle valve, a choke valve, a pulsed fuel valve, and a fuel supply line. The control unit is adapted to control the fuel valve to supply fuel in accordance with a certain start setting.

BACKGROUND

Internal combustion engines of two-stroke or four-stroke type are usually equipped with a fuel supply system of carburetor type or injection type. In a carburetor, the throttle of the carburetor is affected by the operator's demand, so that a wide open throttle produces a minimum throttling in the carburetor barrel. The depression created by the passing air in the carburetor venturi draws fuel into the engine.

When starting a crankcase-scavenged engine having a conventional carburetor, the choke valve is closed by the operator using a choke control and the throttle valve is set in a start gas position. When pulling the pulling cord to start the engine, an air and fuel mixture is delivered to the crankcase of the engine. When a first ignition is heard by the operator, the choke valve is opened to avoid flooding the engine with too much fuel. However, sometimes the operator fails to recognize the first ignition causing the engine to be flooded, resulting in that the product cannot be started as desired.

WO 2012/002888 describes a start setting where a choke valve is closed and a throttle valve is slightly opened at a start or idling throttle position. An air passage permits a leakage of air past the choke valve, thereby diluting the fuel concentration supplied from a start fuel outlet ending a start fuel line. In order to control fuel supply to the internal combustion engine during start, a control unit uses different sensor inputs.

Other types of start setting arrangements are conceivable, but common for all start setting arrangements is that it is important to have control of the fact that a certain start set-up is present.

It is desirable to have a detection arrangement that is capable of handling one or more start-up settings in a reliable and efficient manner.

SUMMARY

The object of the present disclosure is to provide a detection arrangement that provides input relating to a chosen desired start setting, enabling an efficient start procedure.

This object is achieved by means of a carburetor assembly comprising a control unit, an air channel, a throttle valve, a choke valve, a pulsed fuel valve, and a fuel supply line running between the fuel valve and a fuel outlet that is arranged to supply fuel to air running in the air channel. The control unit is adapted to control the fuel valve to supply fuel in accordance with a certain start setting, where the choke valve can be open or closed in said certain start setting. The carburetor assembly comprises a rotation angle detector assembly which in turn comprises a choke detector part that at least indirectly is mounted to a choke shaft that is connected to the choke valve such that the choke detector part is arranged to rotate together with the choke valve. The rotation angle detector assembly further comprises a choke sensor device that is connected to the control unit and is adapted to be affected by the choke detector part such that the choke sensor device provides different output signals to the control unit in dependence of whether the choke valve is open or closed.

According to some aspects, the control unit is adapted to determine whether the choke valve is open or closed.

According to some aspects, the rotation angle detector assembly comprises at least one throttle detector part that at least indirectly is mounted to a throttle shaft that is connected to the throttle valve such that said throttle detector part is arranged to rotate together with the throttle valve. The rotation angle detector assembly further comprises a throttle sensor device that is connected to the control unit and is adapted to be affected by said throttle detector part such that the throttle sensor device provides different output signals to the control unit in in dependence of an opening degree of the throttle valve, enabling the control unit to determine an opening degree of the throttle valve.

According to some aspects, each throttle detector part is constituted by a corresponding throttle magnet and the throttle sensor device is constituted by a throttle magnetic field sensor that is adapted to be affected by magnetic fields of said throttle magnet.

According to some aspects, the choke detector part is constituted by a choke magnet, and the choke sensor device is constituted by a choke magnetic field sensor that is adapted to be affected by magnetic fields of the choke magnet.

According to some aspects, the choke magnetic field sensor is the same as the throttle magnetic field sensor.

According to some aspects, the rotation angle detector assembly comprises a magnetically conducting metal part that in at least one choke position is arranged to be positioned between the choke magnet and the throttle magnetic field sensor.

Other examples are disclosed in the dependent claims.

A number of advantages are obtained by means of the present disclosure. Mainly, a detection arrangement is provided that is arranged to confer input relating to a chosen desired start setting, enabling an efficient start procedure.

BRIEF DESCRIPTION OF THE DRAWINGS

The present disclosure will now be described more in detail with reference to the appended drawings, where.

DETAILED DESCRIPTION

Figure 1:
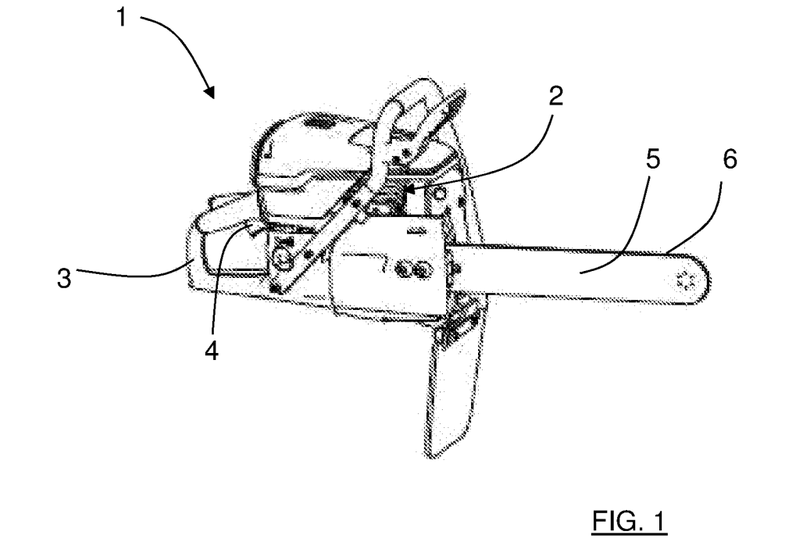
FIG. 1 shows a perspective view of a hand-held chain saw.

With reference to FIG. 1, there is a chain saw 1 that comprises a combustion engine 2, a handle 3 with a throttle lever 4, a guide bar 5 with a saw chain 6. The handle also comprises a running mode switch 16. The combustion engine 2 is a crankcase scavenged, spark ignited, two-stroke engine of a previously well-known kind.

Figure 2:
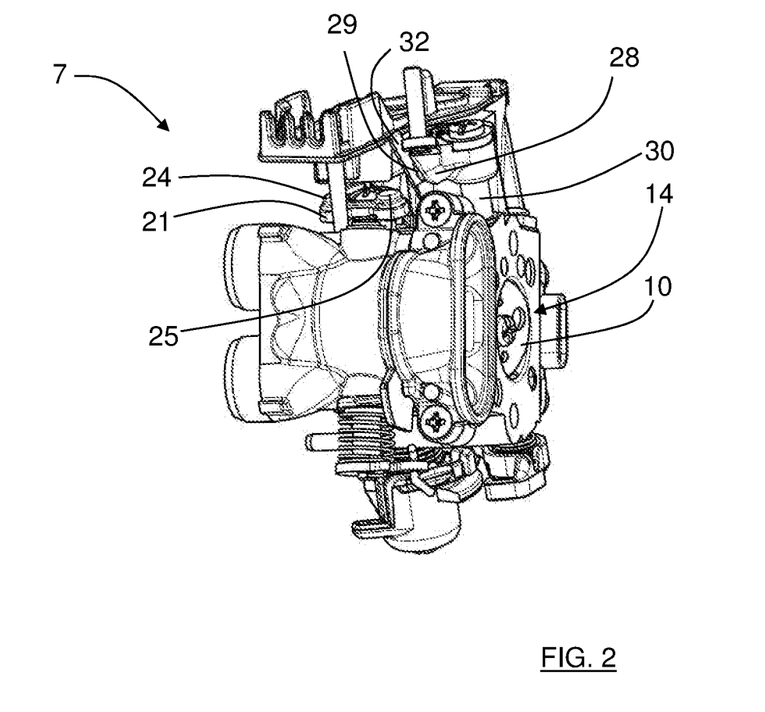
FIG. 2 shows a perspective view of a carburetor assembly with a closed choke valve.
Figure 3:
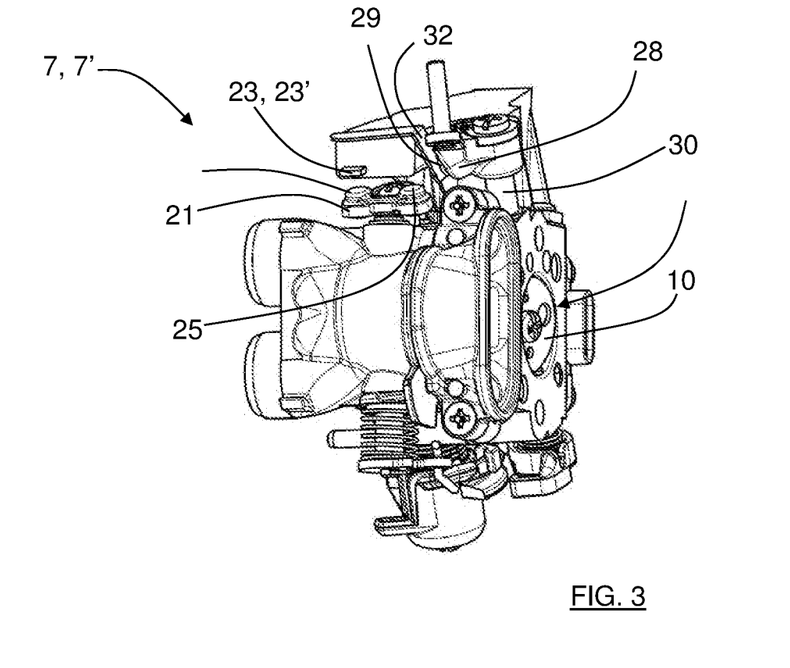
FIG. 3 shows a perspective view of a carburetor assembly with a closed choke valve according to a first example.
Figure 4:
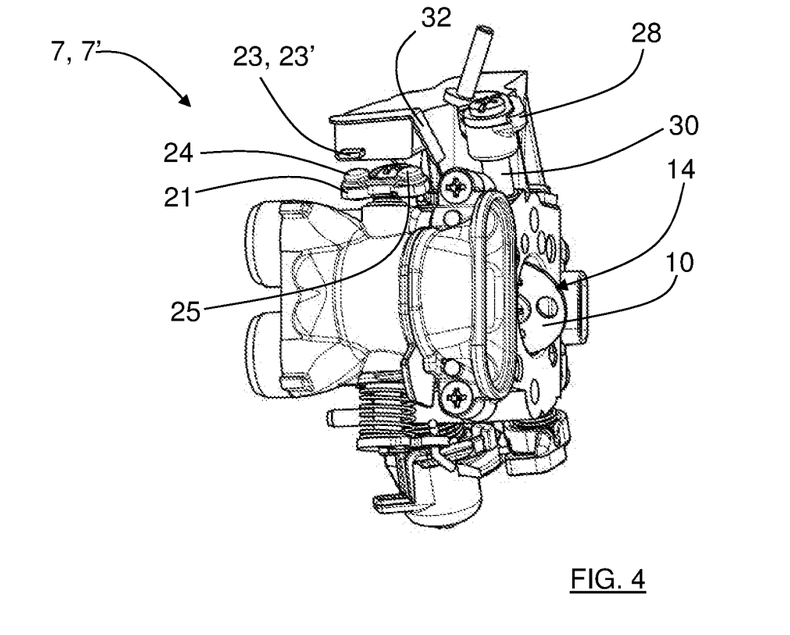
FIG. 4 shows a perspective view of a carburetor assembly with an open choke valve according to the first example.
Figure 5:
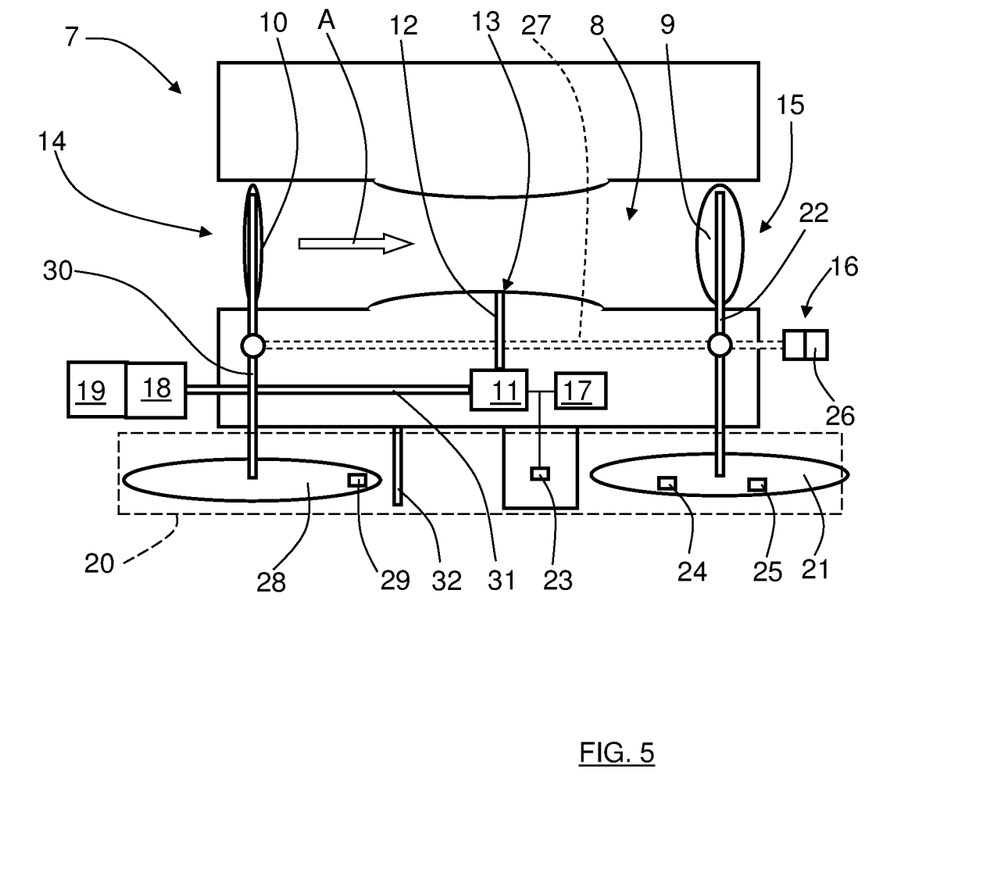
FIG. 5 shows a schematic drawing of a carburetor assembly according to the first example.

In the following, reference is made also to FIG. 2, FIG. 3, FIG. 4 and FIG. 5, where FIG. 2 shows a perspective view of a carburetor assembly with a closed choke valve, FIG. 3 shows a partly cut-open perspective view of a carburetor assembly with a closed choke valve 10, FIG. 4 shows a partly cut-open perspective view of a carburetor assembly with an opened choke valve 10 and FIG. 5 shows a principal schematic drawing of a carburetor assembly. In FIG. 5 all components are shown and marked with a reference number, but in FIG. 2, FIG. 3 and FIG. 4 only those parts visible in the corresponding views are marked with a reference number.

The combustion engine 2 comprises a carburetor assembly 7 that, in turn comprises an air channel 8, a throttle valve 9, a choke valve 10 a pulsed fuel valve 11, a fuel supply line 12 running between the fuel valve 11 and a fuel outlet 13 that is arranged to supply fuel to air running in the air channel 8. Air is arranged to be running from an air inlet 14 to an air outlet 15, where the throttle valve 9 is placed relatively close to the air outlet 15, and where the choke valve 10 is placed relatively close to the air inlet 14. The pulsed fuel valve 11 is in turn connected to a fuel pump arrangement 18 that is adapted to feed fuel from a fuel tank 19 to the pulsed fuel valve 11 via a fuel feed line 31. According to some aspects, the fuel pump arrangement 18 is propelled by crankcase pressure changes. The air inlet 14 is connected to an air intake via an air filter in a previously well-known manner, and the air outlet 15 is connected to a crankcase comprised in the combustion engine 2 in a previously well-known manner.

The running mode switch 16 is arranged for three settings; an off setting, a normal running setting and a start setting. When set in the start setting, the running mode switch 16 is arranged to set the choke valve 10 in a closed position and the throttle valve 9 in a so-called fast idle position, which means that the throttle valve 9 is slightly opened. According to some aspects, this corresponds to an opening angle of about 15°. When the throttle valve 9 is set in a so-called idle position, the throttle valve 9 is closed where only a small slit or aperture enables a small amount of fuel/air mixture to pass in order to enabling an idling state for the combustion engine 2. In the off setting, the ignition is disconnected; according to some aspects the ignition is grounded.

The carburetor assembly 7 further comprises a control unit 17 that is arranged to control the fuel valve 11 in dependence of one or more different sensor inputs.

When the start setting is selected, the choke valve is closed and the throttle valve 9 is set in the fast idle position as shown in FIG. 3 and FIG. 5. When starting the combustion engine 2, the control unit 17 is arranged to control the fuel valve 11 to supply fuel to a suitable amount. According to some aspects, the fuel valve 11 is bi-stable, and when stopped the fuel valve 11 can be either open or closed. When the chain saw 1 is energized by a user pulling a start cord, the control unit 17 is arranged to set the fuel valve 11 in a constant open position until it has been determined that the combustion engine 2 has started.

When the control unit 17 has determined that the combustion engine 2 has started, the control unit 17 is arranged to relatively quickly control the fuel valve 11 to supply fuel to such an amount that a relatively lean fuel mixture is output from the air outlet 15. According to some aspects, the control unit 17 is arranged to close the fuel valve 11 until a certain engine speed has been reached, according to some further aspects when the engine speed exceeds fifty flywheel revolutions per second. Then a normal running regulation of the fuel valve 11 commences.

In this way, the combustion engine 2 is enabled to run for a certain time in the start setting after it has been started even though the choke valve 10 is closed. According to some aspects, in dependence of certain conditions such as ambient temperature, said certain time can be relatively long, and in any case admits a user to start using the throttle for normal running without the engine stopping. It is to be noted that it is important that the lean fuel mixture is output from the air outlet 15 very rapidly from the moment the control unit 17 has determined that the combustion engine 2 has started in order to prevent the combustion engine 2 from stopping.

According to some aspects, the control unit 17 has determined that the combustion engine 2 has started by analyzing sensor input from an engine speed sensor. According to some aspects, either a detected speed, or a detected speed change in the form of an acceleration, or both, form such sensor input to the control unit 17.

According to some aspects, the control unit 17 is arranged to determine that the combustion engine 2 has started if a mean value of engine speed exceeds eight flywheel revolutions per second.

According to some aspects, the control unit 17 is arranged to determine that the combustion engine 2 has started if, following three initial flywheel revolutions, the flywheel acceleration exceeds sixteen flywheel revolutions per second squared for the following two flywheel revolutions 4-5, and/or if the flywheel acceleration exceeds eight flywheel revolutions per second squared following the initial five flywheel revolutions. When the power throttle lever 4 is pressed, the running mode switch 16 automatically switches to the normal running setting where the choke valve 10 is positioned in an open position and the throttle valve 9 is controlled by means of the power throttle lever 4.

By detecting the position of the throttle valve 9 in the normal running setting, the control unit 17 is arranged to control the fuel valve 11 to supply fuel to an amount suited to the present throttle valve 9 position. The detection of the position of the throttle valve 9 is performed by means of a rotation angle detector assembly 20 that comprises a first magnet disc 21 that comprises two throttle magnets 24, 25 and is connected to a throttle shaft 22. The throttle shaft 22 is connected to the throttle valve 9 such that the first magnet disc 21 and the throttle magnets 24, 25 rotate together with the throttle valve 9.

The rotation angle detector assembly 20 further comprises a throttle Hall sensor 23 that is arranged in a fixed manner, where the throttle Hall sensor 23 is shown in the partially cut-open views of FIG. 3 and FIG. 4 as well as in FIG. 5.

Depending on the rotational position of the magnet disc 21, the magnetic field strength will vary at the position of the throttle Hall sensor 23 and an output voltage of the throttle Hall sensor 23 will change continuously in accordance with the strength of the magnetic field, and therefore also with the opening degree of the throttle valve 9.

The throttle Hall sensor 23 is connected to the control unit 17 that is arranged to translate a Hall sensor output signal into an angle. The throttle Hall sensor 23 thus provides different output signals to the control unit 17 in dependence of an opening degree of the throttle valve 9, enabling the control unit 17 to determine an opening degree of the throttle valve 9. The characteristics of a hall sensor vary e.g. with temperature and therefore, according to some aspects, a temperature sensor can be provided for measuring the temperature of the throttle Hall sensor 23, enabling a correct compensation to be applied for different temperatures of the hall sensor.

A hot engine is suitably re-started without a closed choke valve 10 but with the throttle valve 9 in the fast idle position. In order to enable this, the running mode switch 16 comprises a choke switch knob 26, such that when the start setting is selected, i.e. the choke valve 10 is closed and the throttle valve 9 is in the fast idle position, the choke valve can be opened by means of the choke switch knob 26 while maintaining the throttle valve 9 in the fast idle position. The running mode switch 16 and the choke switch knob 26 are connected to the choke valve 10 and the throttle valve 9 via a linkage arrangement 27, only schematically indicated with dashed lines in FIG. 2.

In this case, where the hot engine is re-started with an open choke valve 10 and with the throttle valve 9 in the fast idle position it is important that the control unit 17 does not control the fuel valve 11 to supply fuel in accordance with the normal start setting where the choke valve 10 is closed.

According to some aspects, the hot engine can also be re-started with a closed choke valve 10 and with the throttle valve 9 in the fast idle position, in other words according to the normal start setting. Then it is important that the control unit 17 controls the fuel valve 11 to supply fuel accordingly.

According to some aspects, a hot engine can also be re-started with an open choke valve 10, and with the throttle valve 9 in the idle position, which corresponds to the normal running setting. In this case it is likewise important that the control unit 17 controls the fuel valve 11 to supply fuel accordingly.

Generally, as soon as the chain saw 1 has been sufficiently energized by a user pulling a start cord or when the combustion engine 2 has started, the control unit 17 is adapted to control the fuel valve 11 to supply fuel in accordance with a certain start setting where the choke valve 10 can be open or closed, and, according to some aspects, where the engine can be hot or cold. The control unit 17 is therefore according to some aspects arranged to control the fuel valve 11 to supply fuel in dependence of further sensor inputs which according to some aspects are temperature and engine running speed. Such sensor inputs are also used to determine whether the combustion engine 2 has started as discussed previously.

According to the present disclosure, the position of the choke valve 10 is detected by means of the rotation angle detector assembly 20, which furthermore comprises a second magnet disc 28 that comprises one choke magnet 29 and is connected to a choke shaft 30. The choke shaft 30 is connected to the choke valve 10 such that the second magnet disc 28 and the choke magnet 29 rotate together with the choke valve 10. The rotation angle detector assembly 20 comprises a choke Hall sensor that is connected to the control unit 17, where the choke Hall sensor is arranged to be affected by the choke magnet 29 in such a way that the choke Hall sensor provides different output signals to the control unit 17 in dependence of whether the choke valve 10 is open or closed.

In a first example, the choke Hall sensor is the same as the throttle Hall sensor 23. Since even the closest position of the choke magnet 29, as shown in FIG. 3 where the choke valve is closed, is relatively distant from throttle Hall sensor 23, the rotation angle detector assembly 20 comprises a metal plate 32 that is arranged to be positioned between the choke magnet 29 and the throttle Hall sensor 23. In this way, the magnetic field of the choke magnet 29 is amplified towards the throttle Hall sensor 23. The metal plate comprises a magnetically conducting metal such as iron. In order to prevent corrosion such as rust, the metal can be moulded into a plastic cover or covered with a protective coating. Alternatively, the metal plate can be made in a material that resists corrosion. The metal plate does not have to be in the form of a plate, but can have any suitable shape such as spherical, and is generally constituted by a magnetically conducting metal part.

When the choke valve 10 is in a closed position, the throttle Hall sensor 23 is thus affected by the magnetic field of the choke magnet 29 such that it outputs signals to the control unit 17 that indicate a determined opening degree of the throttle valve 9 that corresponds to an abnormal running condition, according to some aspects an opening degree that does not correspond to the present engine running speed, according to some further aspects such an opening degree is of about 30°-50°. The control unit 17 is therefore enabled to detect that the choke is in a closed position, and to control the fuel valve 11 to supply fuel according to the case when the choke valve 10 is in a closed position and it has determined that the combustion engine 2 has started.

More in detail, as shown in FIG. 4, the choke valve 10 is in an opened position and the throttle Hall sensor 23 is practically only affected by the magnetic field of the two throttle magnets 24, 25 since the choke magnet 29 has been turned away, and as an example this position of the throttle valve is fast idle. The throttle Hall sensor 23 then outputs signals to the control unit 17 that indicate a determined opening degree of the throttle valve 9 that corresponds to fast idle, and adapts the fuel supply accordingly.

Should the choke valve 10 be closed, as shown in FIG. 3 and FIG. 5, the choke magnet 29 is brought towards the metal plate 32 such that its magnetic field affects the throttle Hall sensor 23. The total magnetic field that in this case is detected by the throttle Hall sensor 23 confers output signals to the control unit 17 that indicate an opening degree of the throttle valve 9 that does not correspond to fast idle but to another opening degree that is unique for the present running condition, enabling the control unit 17 to determine that the choke valve 10 is closed, and to control the fuel supply accordingly.

In this way, only one Hall sensor is needed, and that Hall sensor is not adapted for separately detecting the magnetic field of the choke magnet 29, but only the magnetic field of the two throttle magnets 24, 25 which is affected by the magnetic field of the choke magnet 29 when the choke valve 10 is closed, such that the resulting magnetic field is obtained, simulating a certain detected opening degree of the throttle valve 9.

According to some aspects, the throttle Hall sensor 23 is arranged to detect the magnetic field of the choke magnet 29 and the magnetic field of the two throttle magnets 24, 25 separately, such that the control unit 17 is supplied with sensor signals that enables it to determine correct positions of the throttle valve 9 and the choke valve 10 independently of each other. A following second example and third example will disclose how this can be achieved.

Figure 6:
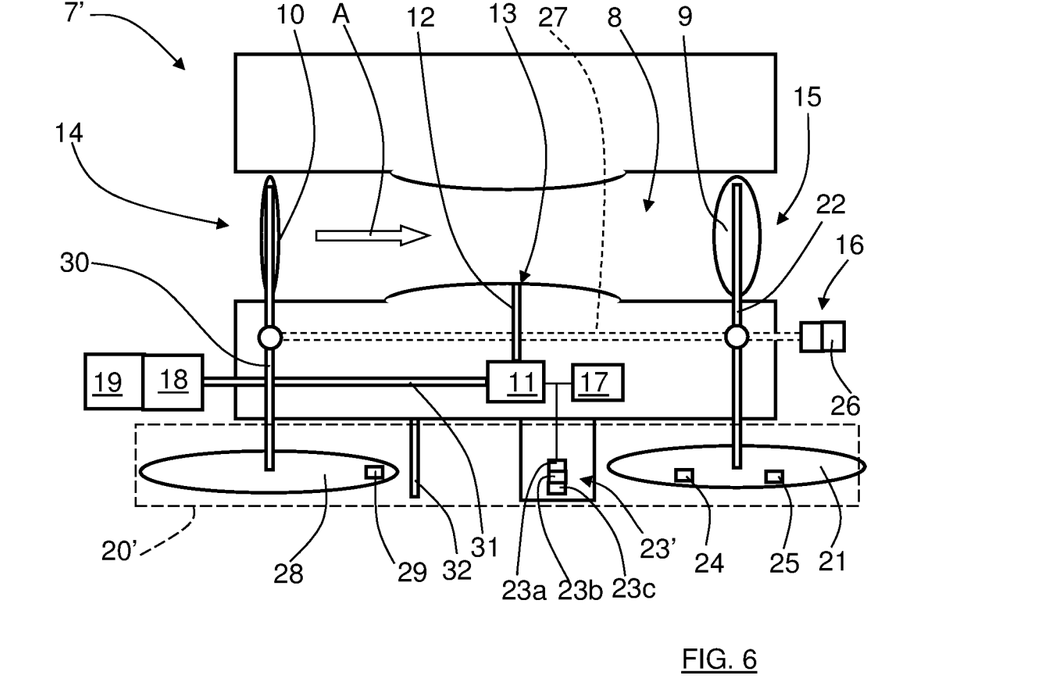
FIG. 6 shows a schematic drawing of a carburetor assembly according to a second example.

FIG. 6 shows a principal schematic drawing of a carburetor assembly 7' according to a second example. Here, the throttle Hall sensor 23' comprises three separate Hall sensor elements 23a, 23b, 23c, where each Hall sensor element 23a, 23b, 23c is arranged for detecting a magnetic field running along a certain direction, where the corresponding detectable directions are perpendicular to each other. In this way, it is possible to distinguish between magnetic fields from different magnets. In order to achieve this, the corresponding magnetic fields of the choke magnet 29 and the magnetic field of the two throttle magnets 24, 25 are mutually perpendicular.

Generally, the throttle magnetic field sensor 23' comprises at least two magnetic field sensor elements 23*a*, 23*b*, 23*c*, where at least two of these magnetic field sensor elements 23*a*, 23*b*, 23*c* are arranged to detect mutually perpendicular magnetic fields.

Figure 7:
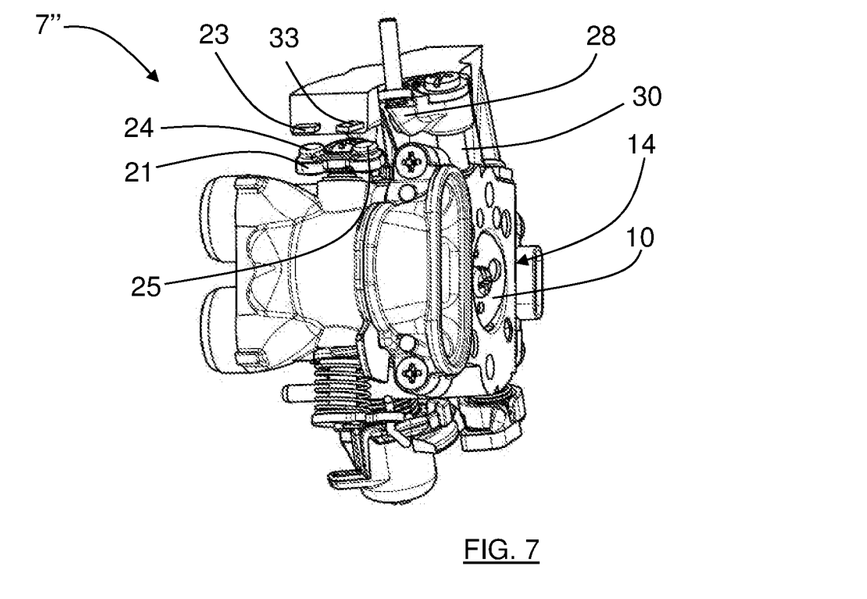
FIG. 7 shows a perspective view of a carburetor assembly with a closed choke valve according to a third example.
Figure 8:
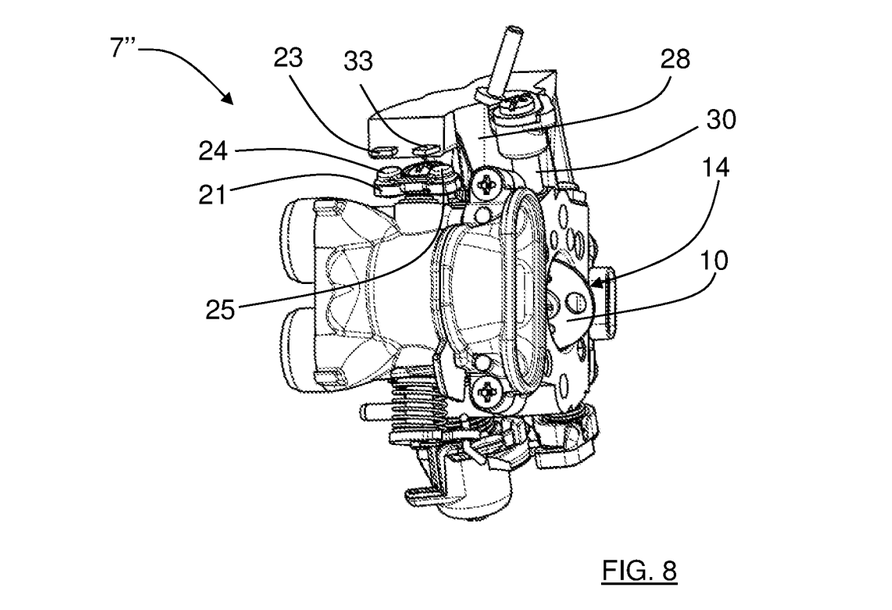
FIG. 8 shows a perspective view of a carburetor assembly with an open choke valve according to the third example.
Figure 9:
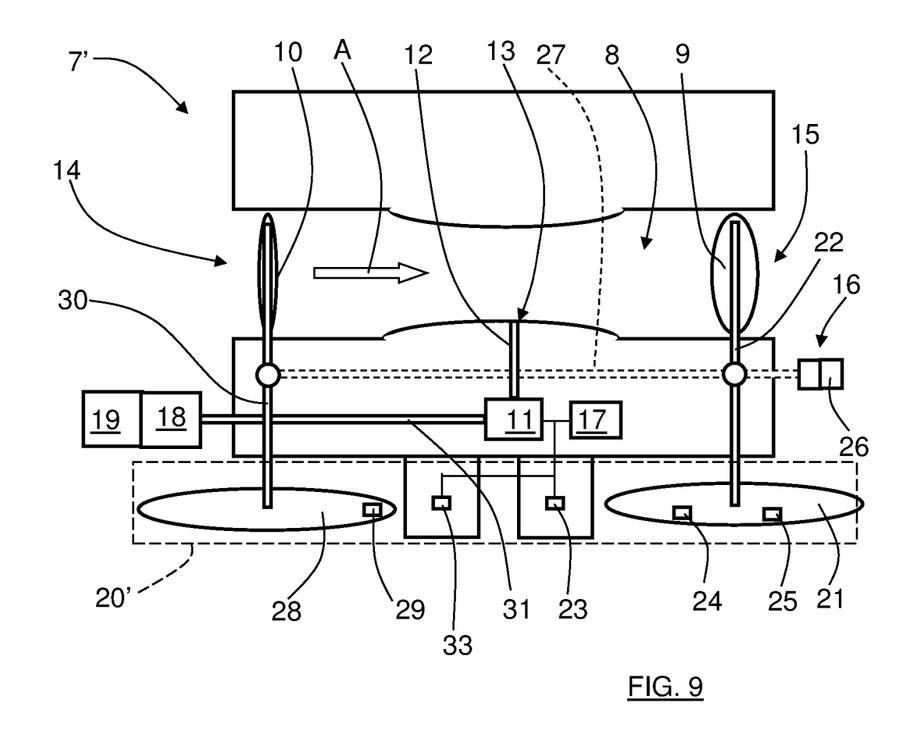
FIG. 9 shows a schematic drawing of a carburetor assembly according to the third example.

With reference to FIG. 7, FIG. 8 and FIG. 9, which correspond to FIG. 3, FIG. 4 and FIG. 5, respectively, a third example of a carburetor assembly 7" will be described. Here, the rotation angle detector assembly 20" comprises a separate choke Hall sensor 33. The throttle Hall sensor 23 is arranged to detect the magnetic fields of the two throttle magnets 24, 25 only, and a separate choke Hall sensor 33 is arranged to detect the magnetic fields of the choke magnet 29 only.

Figure 10:
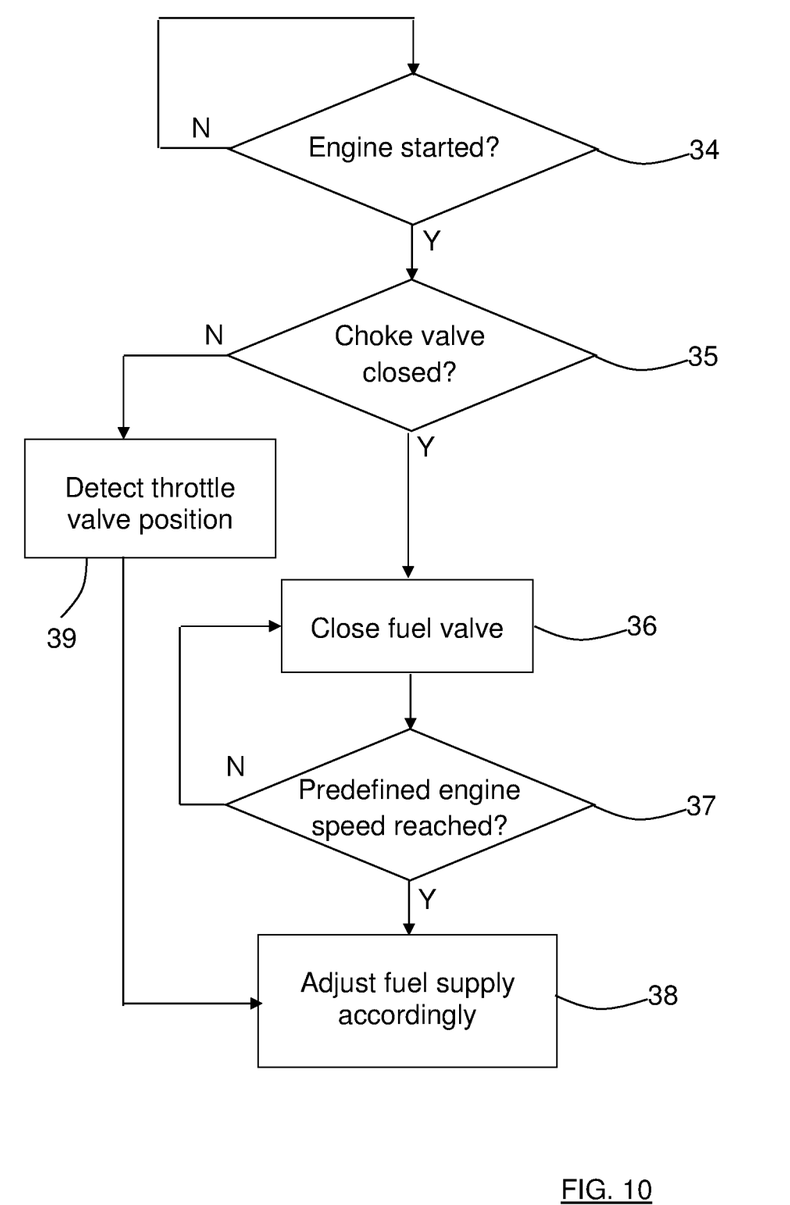
FIG. 10 shows a flow chart of a start-up method.

By means of the rotation angle detector assembly 20 according to the present disclosure, sensor inputs are available to enable an enhanced method for controlling fuel supply at start-up. With reference to FIG. 10, the method comprises:

34: Determining whether the combustion engine 2 has started until it has been determined to have started.
35: If the combustion engine 2 is determined to have started, determining if the choke valve 10 is open or closed.

If the choke valve 10 is closed, the throttle valve 9 is in a fast idle position, and the method comprises:
36: Closing the fuel valve 11.
37: Determining whether the combustion engine 2 has reached a certain predetermined engine speed; according to some further aspects when the engine speed exceeds fifty flywheel revolutions per second as described previously.

While it is determined that the combustion engine 2 does not have reached the predetermined engine speed, the method comprises:
36: Maintaining the fuel valve 11 in a closed position.

When it is determined that the combustion engine 2 has reached the predetermined engine speed, the method comprises:
38: Adjusting the fuel supply such that the combustion engine 2 is maintained running.

If the choke valve is opened, the method comprises:
39: Detecting the position of the throttle valve 9; and
38: adjusting the fuel supply accordingly.

Of course the method can comprise detecting the position of the throttle valve 9 irrespective of if the choke valve 10 is closed or not, but according to some aspects, if the choke valve 10 is closed, the throttle valve 9 is always in a fast idle position, i.e. the choke valve 10 cannot be closed with the throttle valve 9 in any other position.

The present disclosure is not limited to the examples above, but can vary freely within the scope of the appended claims. For example, the first magnet disc 21 can comprise only one throttle magnet, or more than two. Similarly, the second magnet disc 28 can comprise two or more choke magnets. As depicted in the perspective views of the carburetor, the magnet discs 21, 28 do not need to be disc-shaped but are generally constituted by magnet holding parts.

When terms like perpendicular, parallel and the like are used, these terms are not to be interpreted as mathematically exact, but within what is practically obtainable.

Above, a chain saw has been described as suitable for comprising the carburetor assembly 7. Generally, the carburetor assembly 7 according to the present disclosure can be used in any suitable power tool having a combustion engine, for example a power cutter or a clearing saw. A combustion engine that comprises the carburetor assembly 7 according to the present disclosure can be any type of two- or four-stroke engine, although also non-crankcase-scavenged engines are possible.

The metal plate 32 can be omitted if the desired effect can be achieved without it.

Each Hall sensor is generally constituted by any type of suitable corresponding magnetic field sensor, such that the choke Hall sensor generally is constituted by a choke magnetic field sensor 23, 33 and the throttle Hall sensor is generally constituted by a throttle magnetic field sensor 23.

According to some aspects, rotation angle detector assembly 20 comprises other parts using other properties than magnetic properties. According to some aspects, instead of magnets, there are slots, apertures, indents or markings, where these are detected by means of an optic sensor.

According to some aspects, instead of magnets, there is a part with a varying measures at least indirectly mounted to the choke shaft 30 and/or throttle shaft 22, where these are detected by means of a capacitive or inductive sensor.

Generally, the magnets or other corresponding parts are constituted by a corresponding choke detector part 29 and corresponding at least one throttle detector part 24, 25. The magnetic field sensors or other corresponding parts are constituted by a corresponding choke sensor device 23, 33 and a corresponding throttle sensor device 23.

The control unit 17 is either constituted by one unit or by two or more separate units.

Generally, the present disclosure relates to a carburetor assembly 7 comprising a control unit 17, an air channel 8, a throttle valve 9, a choke valve 10, a pulsed fuel valve 11, and a fuel supply line 12 running between the fuel valve 11 and a fuel outlet 13 that is arranged to supply fuel to air A running in the air channel 8, where the control unit 17 is adapted to control the fuel valve 11 to supply fuel in accordance with a certain start setting. The choke valve 10 can be open or closed in said certain start setting, where the carburetor assembly 7 comprises a rotation angle detector assembly 20 which in turn comprises a choke detector part 29 that at least indirectly is mounted to a choke shaft 30 that is connected to the choke valve 10 such that the choke detector part 29 is arranged to rotate together with the choke valve 10, where the rotation angle detector assembly 20 further comprises a choke sensor device 23, 33 that is connected to the control unit 17 and is adapted to be affected by the choke detector part 29 such that the choke sensor device 23, 33 provides different output signals to the control unit 17 in dependence of whether the choke valve 10 is open or closed.

According to some aspects, the control unit 17 is adapted to determine whether the choke valve 10 is open or closed.

According to some aspects, the rotation angle detector assembly 20 comprises at least one throttle detector part 24, 25 that at least indirectly is mounted to a throttle shaft 22 that is connected to the throttle valve 9 such that said throttle detector part 24, 25 is arranged to rotate together with the throttle valve 9, where the rotation angle detector assembly 20 further comprises a throttle sensor device 23 that is connected to the control unit 17 and is adapted to be affected by said throttle detector part 24, 25 such that the throttle sensor device 23 provides different output signals to the control unit 17 in in dependence of an opening degree of the throttle valve 9, enabling the control unit 17 to determine an opening degree of the throttle valve 9.

According to some aspects, each throttle detector part is constituted by a corresponding throttle magnet 24, 25 and the throttle sensor device is constituted by a throttle magnetic field sensor 23 that is adapted to be affected by magnetic fields of said throttle magnet 24, 25.

According to some aspects, the choke detector part is constituted by a choke magnet 29 and that the choke sensor device is constituted by a choke magnetic field sensor 23, 33 that is adapted to be affected by magnetic fields of the choke magnet 29.

According to some aspects, the choke magnetic field sensor is the same as the throttle magnetic field sensor 23.

According to some aspects, the rotation angle detector assembly 20 comprises a magnetically conducting metal part 32 that in at least one choke position is arranged to be positioned between the choke magnet 29 and the throttle magnetic field sensor 23.

According to some aspects, when the choke valve 10 is in a closed position, the throttle magnetic field sensor 23 is arranged to output signals to the control unit 17 that indicate a determined opening degree of the throttle valve 9 that is unique for the present running condition, enabling the control unit 17 to determine that the choke valve 10 is closed, and to control the fuel supply accordingly.

According to some aspects, the throttle magnetic field sensor 23' comprises at least two magnetic field sensor elements 23a, 23b, 23c where at least two of these magnetic field sensor elements 23a, 23b, 23c are arranged to detect mutually perpendicular magnetic fields.

According to some aspects, the rotation angle detector assembly 20" comprises a separate choke magnetic field sensor 33 arranged to detect the magnetic fields of the choke magnet 29 only.

The invention claimed is:

1. A carburetor assembly comprising:
   a control unit,
   an air channel,
   a throttle valve,
   a choke valve,
   a pulsed fuel valve,
   a fuel supply line running between the pulsed fuel valve and a fuel outlet that is arranged to supply fuel to air running in the air channel, and
   a rotation angle detector assembly,
   wherein the control unit is adapted to control the fuel valve to supply fuel in accordance with a certain start setting,
   wherein the choke valve is configured to be open or closed in said certain start setting,
   wherein the rotation angle detector assembly comprises:
      a throttle detector part that is at least indirectly mounted to a throttle shaft that is connected to the throttle valve such that the throttle detector part is arranged to rotate together with the throttle valve,
      a choke detector part that is at least indirectly mounted to a choke shaft that is connected to the choke valve such that the choke detector part is arranged to rotate together with the choke valve, and
      a sensor device that is connected to the control unit and is adapted configured to be affected by the throttle detector part and the choke detector part such that the choke sensor device provides different output signals to the control unit in dependence of whether the choke valve is open or closed and an opening degree of the throttle valve.

2. The carburetor assembly according to claim 1, wherein the control unit is configured to determine whether the choke valve is open or closed.

3. The carburetor assembly according to claim 1, wherein the throttle detector part is a first throttle detector part;
   wherein the rotation angle detector assembly comprises a plurality of throttle detector parts including the first throttle detector part and a second throttle detector part,
   wherein the second throttle detector part is at least indirectly mounted to the throttle shaft that is connected to the throttle valve such that the second throttle detector part is arranged to rotate together with the throttle valve.

4. The carburetor assembly according to claim 3, wherein each throttle detector part of the plurality of throttle detector parts comprises a corresponding throttle magnet and the sensor device comprises a magnetic field sensor that is configured to be affected by corresponding magnetic fields of the throttle magnets.

5. The carburetor assembly according to claim 1, wherein the choke detector part comprises a choke magnet and the sensor device comprises a magnetic field sensor that is configured to be affected by a magnetic fields of the choke magnet.

6. The carburetor assembly according to claim 5, wherein the throttle detector part comprises a throttle magnet and
   wherein the magnetic field sensor is configured to be affected by both the magnetic field of the choke magnet and a magnetic field of the throttle magnet.

7. The carburetor assembly according to claim 6, wherein the rotation angle detector assembly comprises a magnetically conducting metal part that in at least one choke position is positioned between the choke magnet and the magnetic field sensor to amplify the magnetic field of the choke magnet.

8. The carburetor assembly according to claim 6, wherein when the choke valve is in a closed position, the magnetic field sensor is configured to output signals to the control unit that indicate the opening degree of the throttle valve that is unique for a present running condition of the carburetor assembly, thereby enabling the control unit to determine that the choke valve is closed and control the pulsed fuel valve to supply fuel to the air running in the air channel based on the choke valve being closed and the opening degree of the throttle valve.

9. The carburetor assembly according to claim 6, wherein the magnetic field sensor comprises at least two magnetic field sensor elements where at least two of the magnetic field sensor elements are configured to detect mutually perpendicular magnetic fields.

10. The carburetor assembly according to claim 1, further comprising a temperature sensor configured to measure a temperature of the choke detector part for use in compensating for temperature-based variances in the choke detector part.

11. The carburetor assembly according to claim 10, wherein the control unit is further configured to control pulsed fuel valve based on the output signals of the sensor device indicating whether the choke valve is open or closed and an opening degree of the throttle valve, the temperature, and an engine speed.

12. The carburetor assembly according to claim 1, wherein the control unit is configured to determine that an engine is running and, based on the output signals from the sensor device, that the choke valve is closed; and
   control the pulsed fuel valve to supply fuel to the air running in the air channel in response to and based on the engine being running and the choke valve being closed.

* * * * *